(12) United States Patent
Manan et al.

(10) Patent No.: US 12,145,104 B2
(45) Date of Patent: Nov. 19, 2024

(54) SYSTEM AND METHOD FOR SOLVENT REGENERATION

(71) Applicants: Petroliam Nasional Berhad (PETRONAS), Kuala Lumpur (MY); Dalian Institute of Chemical Physics China Academy of Science, Dalian (CN)

(72) Inventors: Norfaizah A. Manan, Kuala Lumpur (MY); Guodong Kang, Liaoning (CN); Zhe Phak Chan, Selangor (MY); Syafiqa M. Saleh, Kuala Lumpur (MY); Yiming Cao, Dalian (CN)

(73) Assignees: Petroliam Nasional Berhad (PETRONAS), Kuala Lumpur (MY); Dalian Institute of Chemical Physics China Academy of Science, Dalian (CN)

( * ) Notice: Subject to any disclaimer, the term of this patent is extended or adjusted under 35 U.S.C. 154(b) by 0 days.

(21) Appl. No.: 18/102,544

(22) Filed: Jan. 27, 2023

(65) Prior Publication Data
US 2023/0356148 A1     Nov. 9, 2023

Related U.S. Application Data

(63) Continuation of application No. 17/050,437, filed as application No. PCT/CN2018/084174 on Apr. 24, 2018, now abandoned.

(51) Int. Cl.
*B01D 53/96*     (2006.01)
*B01D 5/00*     (2006.01)
(Continued)

(52) U.S. Cl.
CPC ............ *B01D 53/96* (2013.01); *B01D 5/006* (2013.01); *B01D 19/0005* (2013.01);
(Continued)

(58) Field of Classification Search
None
See application file for complete search history.

(56) References Cited

U.S. PATENT DOCUMENTS

2009/0118551 A1*  5/2009  Buijs ..................... B01D 63/06
                                                           95/43
2010/0319532 A1   12/2010  Iijima et al.
(Continued)

FOREIGN PATENT DOCUMENTS

CN     101822931 A     9/2010
CN     103877828 A     6/2014
(Continued)

OTHER PUBLICATIONS

Guo, Yanhua; International Search Report; PCT/CN2018/084174; Jan. 14, 2019; 4 pages.
(Continued)

*Primary Examiner* — Jason M Greene
(74) *Attorney, Agent, or Firm* — Bradley Arant Boult Cummings LLP

(57) ABSTRACT

A system for regeneration of acidic gas solvent, the system comprising; a regeneration cell having a solvent chamber arranged to receive a solvent flow, and an internal chamber arranged to receive a steam flow; said regeneration cell including a gas permeable membrane separating the solvent chamber and internal chamber; wherein the regeneration cell is arranged to vent acidic gas stripped from the solvent by the steam.

7 Claims, 5 Drawing Sheets

(51) Int. Cl.
*B01D 19/00* (2006.01)
*B01D 53/14* (2006.01)
*B01D 61/36* (2006.01)
*B01D 63/04* (2006.01)

(52) U.S. Cl.
CPC ..... *B01D 19/0031* (2013.01); *B01D 53/1425* (2013.01); *B01D 53/1462* (2013.01); *B01D 61/366* (2013.01); *B01D 63/046* (2013.01); *B01D 2252/20478* (2013.01); *B01D 2257/304* (2013.01); *B01D 2257/504* (2013.01)

(56) References Cited

U.S. PATENT DOCUMENTS

| | | |
|---|---|---|
| 2011/0117639 A1 | 5/2011 | Suazo et al. |
| 2012/0216678 A1* | 8/2012 | Geuzebroek ....... B01D 53/1456 252/190 |
| 2012/0247327 A1 | 10/2012 | Omole |
| 2014/0007768 A1* | 1/2014 | van den Broeke .................. B01D 53/1425 96/6 |
| 2014/0309471 A1* | 10/2014 | Zhou .................. B01D 53/1462 96/6 |
| 2018/0015409 A1* | 1/2018 | Cruz .................. B01D 53/1425 |

FOREIGN PATENT DOCUMENTS

| | | |
|---|---|---|
| CN | 105517690 A | 4/2016 |
| CN | 107198967 A | 9/2017 |
| EP | 2742988 A1 | 6/2014 |

OTHER PUBLICATIONS

Ho, W.S. Winston et al., Membrane Handbook, Ocean Press, 1999, Beijing, pp. 837-849.

Yudong, Wang, Natural Gas Treatment and Processing Technology, Petroleum Industry Press, Apr. 2007, Beijing, pp. 159-162.

* cited by examiner

SYSTEM AND METHOD FOR SOLVENT REGENERATION

CROSS-REFERENCE TO RELATED APPLICATIONS

This patent application is a continuation of U.S. patent application Ser. No. 17/050,437, the entire contents of which are incorporated by reference.

FIELD OF THE INVENTION

The invention relates to the regeneration of solvent laden with acidic gas, such as $CO_2$ and $H_2S$ for the reuse of the solvent and subsequent disposal of the $CO_2$ and other acid gases.

BACKGROUND

For clarity, reference to $CO_2$, will further apply to $H_2S$ and other acid gases, unless the application would make such an extension unworkable.

In order to remove $CO_2$, $H_2S$ and other acid gases from an LNG process stream, it is chemically absorbed by a solvent, for instance, an alkanolamine. The solvent is used as a medium for transport of the $CO_2$ for disposal and hence the $CO_2$ must be subsequently removed so as to regenerate the solvent.

Regeneration of the solvent according to the prior art involves flowing the liquid solvent into a stripper in the form of a regeneration column where the liquid is heated so as to desorb the $CO_2$ from the liquid. The $CO_2$ is subsequently vented for downstream disposal and the solvent returned to the absorption stage for reuse.

The energy usage in stripping $CO_2$ from the solvent is considerable and consequently there is a need for a lower energy means to achieve the regeneration process. Further, the introduction of steam and solvent into the column can lead to foaming of the solvent, reducing the flow characteristics.

Further, the use of tall high volume column tends to promote "sloshing" through the higher centre of gravity of such structures. Using existing processes, such column chambers are important, but ultimately limited by their height (through consequential maintenance limitations) and volume because of the increased centre of gravity, particularly for offshore applications. Conventional technology is also not modular thus it has a certain turn down ratio, and so it cannot be relocated to another plant.

STATEMENT OF INVENTION

In a first aspect, the invention provides a system for regeneration of acidic gas solvent, the system comprising; a regeneration cell having a solvent chamber arranged to receive a solvent flow, and an internal chamber arranged to receive a steam flow; said regeneration cell including a gas permeable membrane separating the solvent chamber and internal chamber; wherein the regeneration cell is arranged to vent acidic gas stripped from the solvent by the steam.

In a second aspect, the invention provides a method for regenerating acidic gas solvent, the method comprising the steps of; receiving a solvent flow in a solvent chamber; receiving a steam flow in an internal chamber; separating the internal chamber from the solvent chamber with a gas permeable membrane; stripping the acidic gas from the solvent; diffusing the acidic gas into the internal chamber, and; venting the acidic gas from the internal chamber.

Accordingly, by applying steam into a chamber adjacent to the $CO_2$ laden solvent, the heat from the steam is more efficiently applied to the stripping process instead of being lost as waste energy. In a further embodiment, residual heat of the steam, following the stripping process, may also be reused thus reducing further the net waste energy lost during the regeneration process.

By introducing the gas permeable membrane, as foaming commences, the $CO_2$ bubbles diffuse the membrane, preventing foaming and so avoiding the flow restrictions experienced by prior art. Essentially the membrane provides a path by which the $CO_2$ can quickly be removed from the solvent before foaming commences.

In one embodiment, a re-boiler is used to receive the stripped solvent from the regeneration cell, the re-boiler arranged to remove entrained liquid, such as water, from the solvent. The solvent may then be re-used.

Further, the steam formed from the liquid removal may be used in the regeneration cell to enhance the stripping process. Further still, the steam used in the regeneration cell may be wholly sourced from the steam generated by the re-boiler.

It will be appreciated that the invention is applicable for a range of solvent regeneration systems including, for instance, systems using absorber columns and or membrane contactor absorbers.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

Figure 1:
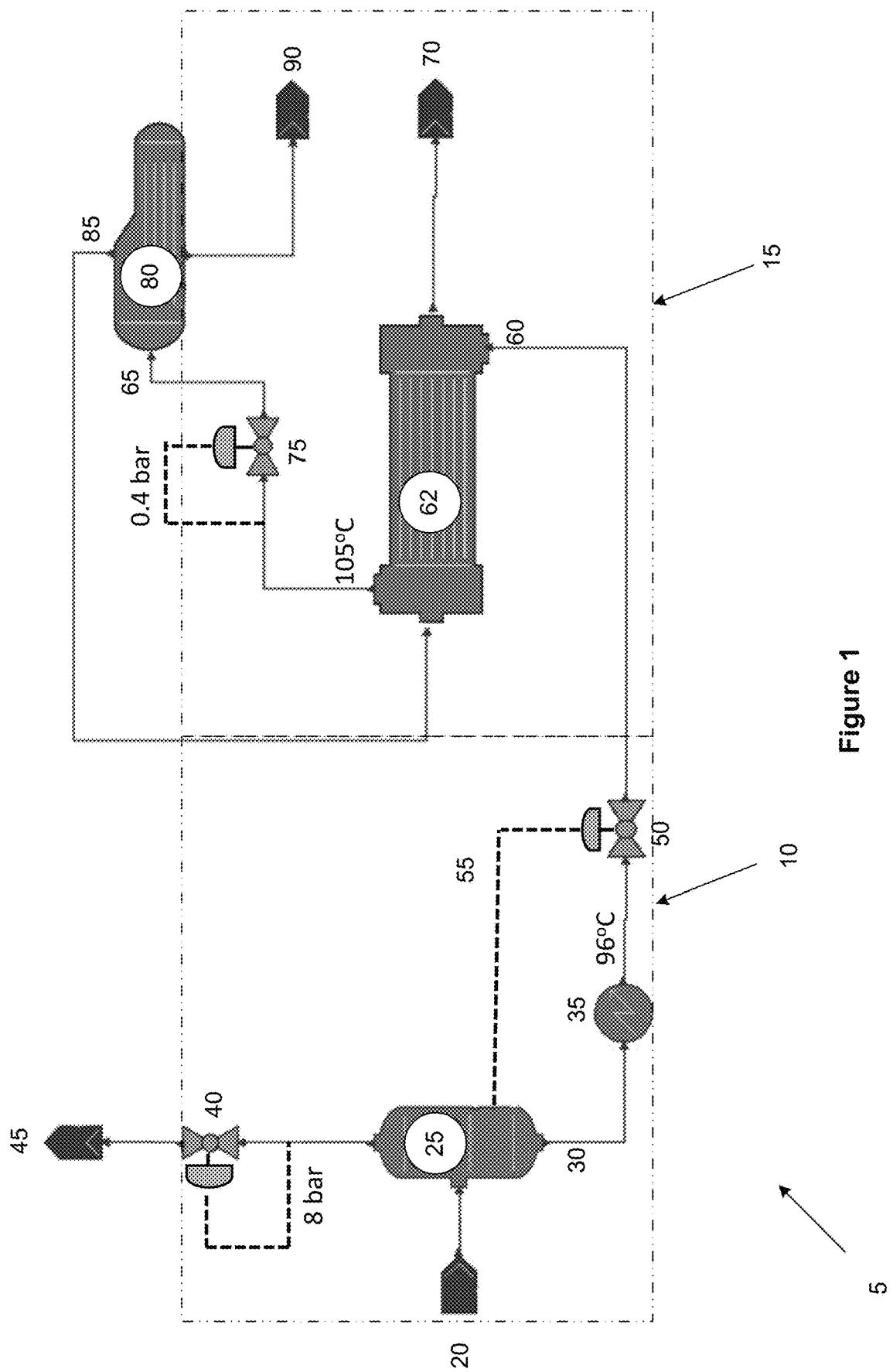
FIG. 1 is a schematic view of the regeneration system according to one embodiment of the present invention.

FIG. 1 shows a regeneration system 5 according to one embodiment of the present invention. Here the system 5 comprises a hydrocarbon removal step 10 followed by the regeneration step 15. A high pressure flash drum 25 receives a feed of solvent laden with an acidic gas, such as an alkanolamine laden with $CO_2$, and subsequently vents the hydrocarbon 45 through a valve 40. Levels 55 are controlled by a controller 50 within the flash drum 25 with the lean amine flow passing through a lean rich heat exchanger and subsequently introduced into a membrane contactor cell 62. The membrane contactor cell 62 receives a flow 85 of steam into a central core (not shown) which strips the $CO_2$ and other acid gases which are vented 70. The stripped amine then flows into a reboiler 80, via a valve 75, for re-boiling.

The amine is subsequently delivered 90 back to the lean rich heat exchanger 35. Steam from the reboiler 80 is vented into the membrane contactor cell 62 as previously mentioned. Importantly the steam vented by the reboiler is used to heat up the solvent in the membrane contactor to approximately 105° C., which is lower than the conventional column temperature (approx. 131° C.). Consequently, this represents an energy saving as well as saving infrastructure costs.

Figure 2:
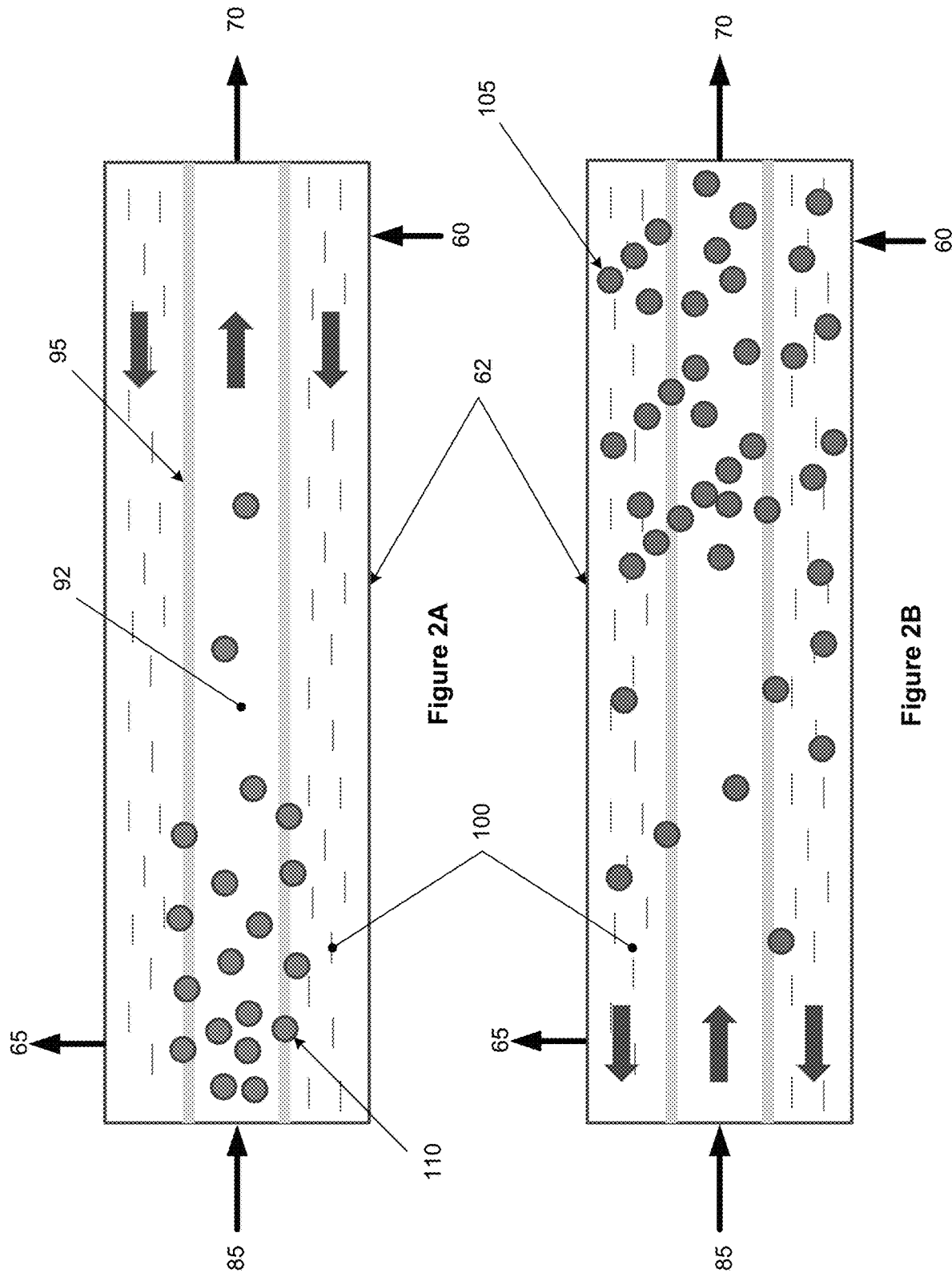
FIGS. 2A and 2B are schematic views of a membrane contactor cell according to a further embodiment of the present invention.

The process is better demonstrated in FIGS. 2A and 2B which show a two-step action of introducing 85 steam 110 into an internal chamber 92. In this embodiment the internal chamber 92 is separated from the solvent chamber 100 by a gas permeable membrane 95. Said membrane may be hydrophobic, and include materials such like polysulfone, PTFE, PVDF, PP, PEEK, surface coated membranes or other such suitable material.

The $CO_2$ laden solvent is introduced 60 into the solvent chamber 100 but prevented from entering the internal chamber 92 by the gas permeable membrane 95. The steam 110 interacts through the membrane 95 with the solvent stripping the $CO_2$ 105 from the solvent and venting the $CO_2$ 70 from an outlet in gas communication with the internal chamber 92. The flow of steam from the inlet 85 to the outlet 70 drives against the flow of solvent from the inlet 60 to the outlet 65. This tends to concentrate the $CO_2$ gas 105 about the gas outlet 70 aiding in the stripping process. Thus, the $CO_2$ flows out of the cell 62 as the steam is condensed, with the stripped solvent flowing out 65 of the cell 62 towards the reboiler.

TABLE 1

|  | Initial $CO_2$ Loading, mol/mol | Final $CO_2$ Loading, mol/mol | Liquid Inlet Temperature, ° C. | Liquid Outlet Temperature, ° C. | Vessel-volume/flow, minutes |
|---|---|---|---|---|---|
| Membrane Regeneration System | 0.43 | 0.001 | 94.5 | 105 | 24.54 |
| Conventional Using Column Regeneration | 0.30 | 0.01 | 114 | 131 | 47.90 |

Module 2.5 cm ID, 50 cm length, membrane area 0.31 $m^2$
MBC liquid flow rate is 0.60 L/hr As can be seen, the system according one embodiment of the present invention provides a final $CO_2$ loading in the regenerated solvent of 0.001 mol/mol as compared to a conventional system using column regeneration having a final $CO_2$ loading of 0.01 mol/mol.

Further, the vessel-volume/flow for this embodiment is 24.54 as compared to 47.90 for the conventional system. The reduction in vessel-volume/flow consequently suggests to a reduction in the required infrastructure and therefore a significant reduction in capital expenditure for the invention as compared to the systems of the prior art.

Figure 3:
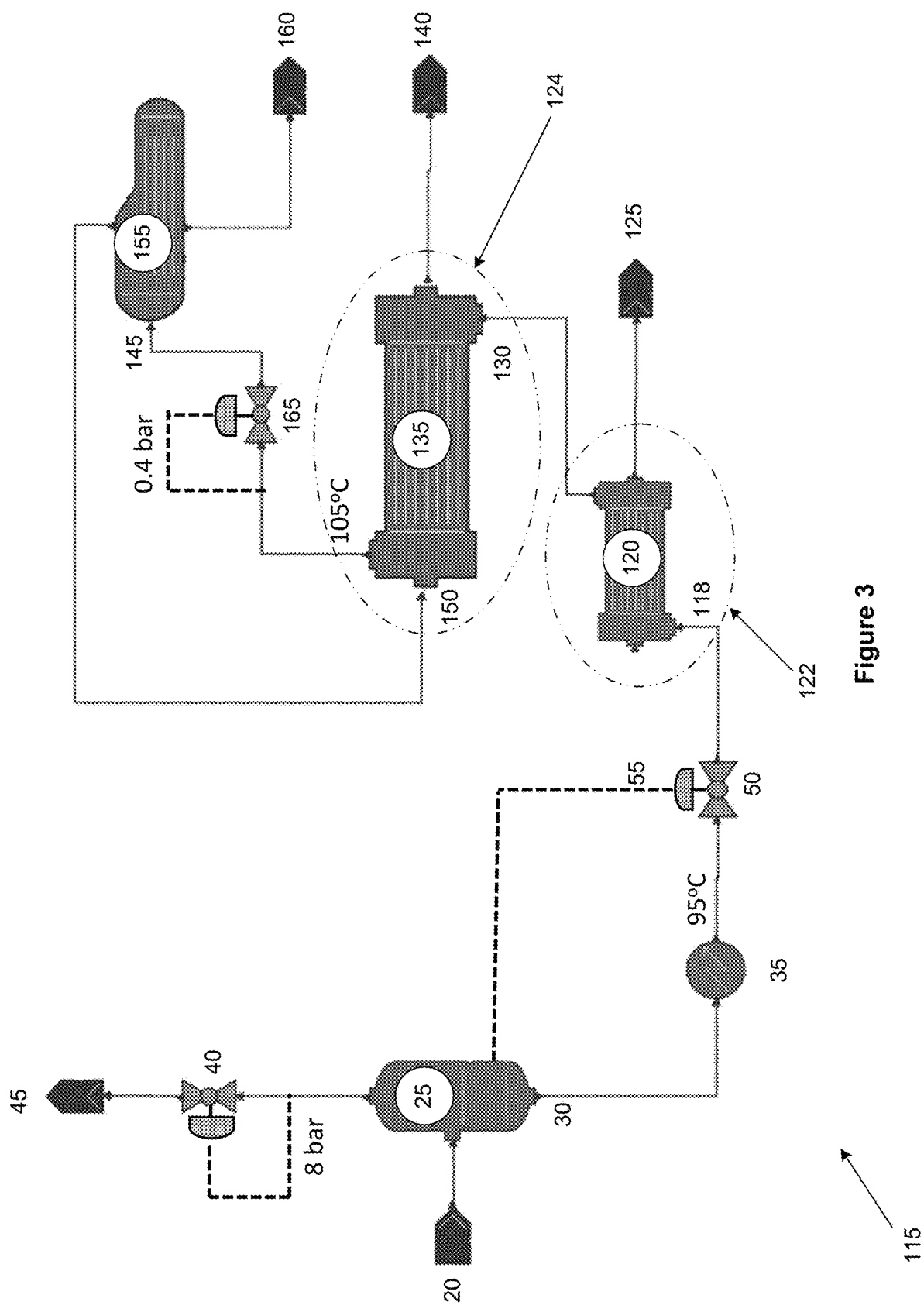
FIG. 3 is a schematic view of the regeneration system according to a further embodiment of the present invention.

FIG. 3 shows a further embodiment with the regeneration system 115 having a similar front end hydrocarbon removal system. The variation in this embodiment is having a two-stage regeneration system. The first stage 122 includes a membrane contactor cell 120 that acts like a bulk removal chamber of the prior art. Again, the solvent 118 enters the bulk removal regeneration cell 120 into the corresponding bulk removal solvent chamber. The bulk removal internal chamber includes a gas permeable membrane for separating the bulk removal internal chamber from the bulk removal solvent chamber. This allows for the diffusion of $CO_2$ into the bulk removal internal chamber and consequent venting 125. In this first stage 122 no steam is used and hence a low temperature low pressure environment in the membrane contactor cell 120 efficiently removes a portion of the $CO_2$ before delivering to the second stage 124. It will be noted that, whilst the steam flow is in a direction counter to the solvent flow, for the bulk removal regeneration cell the flow of $CO_2$ is in the same direction as the solvent flow.

The second stage acts in a similar manner to that of the embodiment of FIG. 1 whereby the solvent having a reduced $CO_2$ concentration enters the solvent chamber of a membrane contactor cell 135. Steam is introduced 150 into the internal chamber stripping the remaining $CO_2$ from the solvent and venting 140 the $CO_2$. The stripped solvent is then delivered 145 to a reboiler 155 which, as with the previous embodiment, directs steam back to the second stage cell 135 and regenerates the stripped solvent 160 back to the lean rich heat exchanger.

TABLE 2

|  | Initial $CO_2$ Loading, mol/mol | Final $CO_2$ Loading, mol/mol | Liquid Inlet Temperature, ° C. | Liquid Outlet Temperature, ° C. | Vessel-volume/flow |
|---|---|---|---|---|---|
| Membrane Regeneration System one stage | 0.42 | 0.01 | 111 | 106 | 24.54 |
| $1^{st}$ Stage | 0.43 | 0.10 | 114 | 99 | 11.78 |
| $2^{nd}$ Stage | 0.10 | 0.01 | 99 | 105 | |
| Conventional Using Column Regeneration | 0.30 | 0.01 | 114 | 131 | 47.90 |

MBC $1^{st}$ Stage
Module 1.5 cm ID, 50 cm length, membrane area 0.22 $m^2$
MBC liquid flow rate is 2.70 L/hr
$CO_2$ flux is 0.0223 kmol/($m^2 \cdot$ hr)
Vessel-volume/flow is 1.96

MBC $2^{nd}$ Stage
Module 3.4 cm ID, 50 cm length, membrane area 0.56 $m^2$
MBC liquid flow rate is 2.70 L/hr
$CO_2$ flux is 0.0022 kmol/($m^2 \cdot$ hr)
Vessel-volume/flow is 9.82

Figure 4:
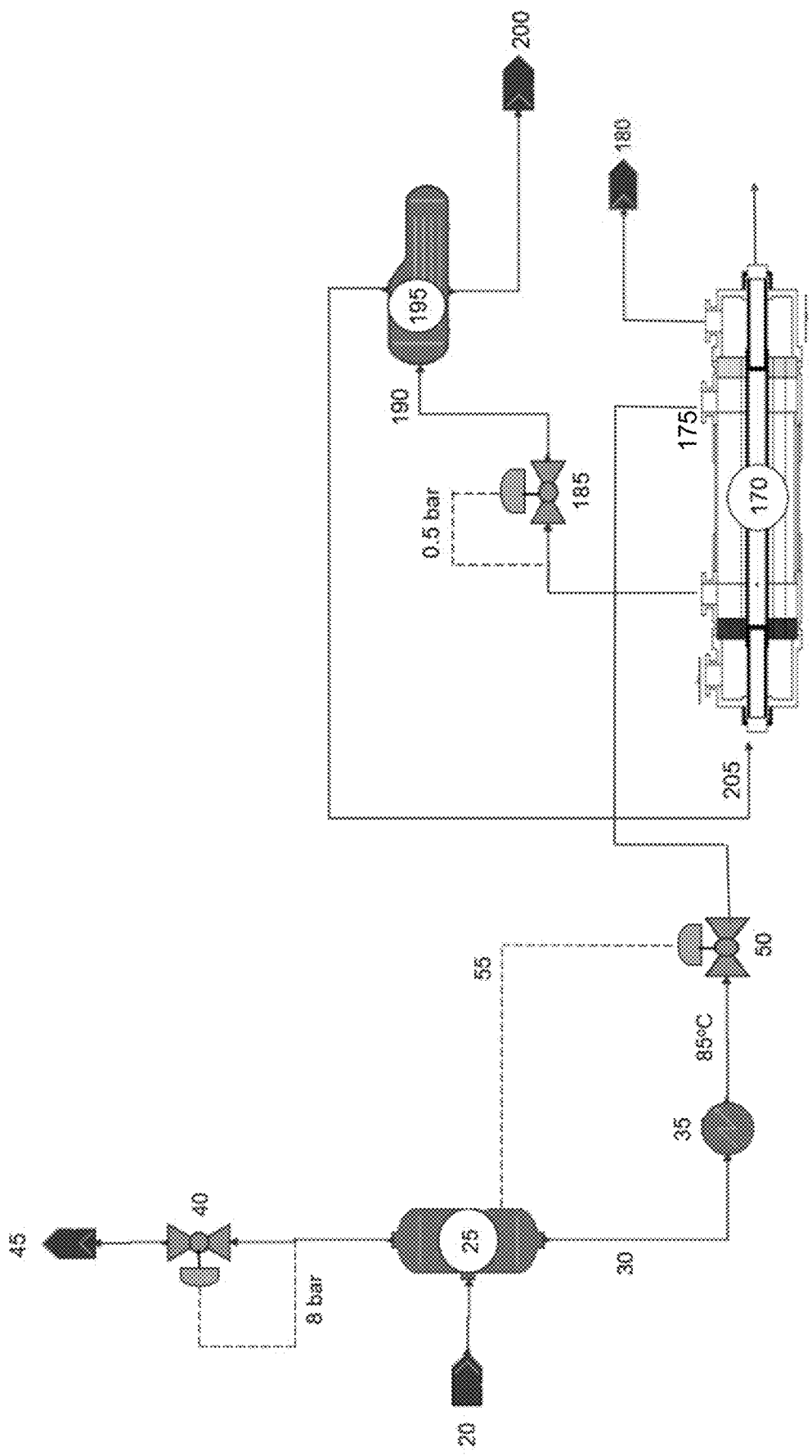
FIG. 4 is a schematic view of a regeneration system according to a still further embodiment of the present invention.

FIG. 4 shows a schematic view of a further embodiment of the present invention. Again the front end hydrocarbon removal system is the same. However, the cell for the regeneration side has been replaced by a cell having a heat element in place of the membrane isolated internal chamber. The arrangement is similar whereby $CO_2$ latent solvent is introduced 175 into the new cell 170.

Figure 5:
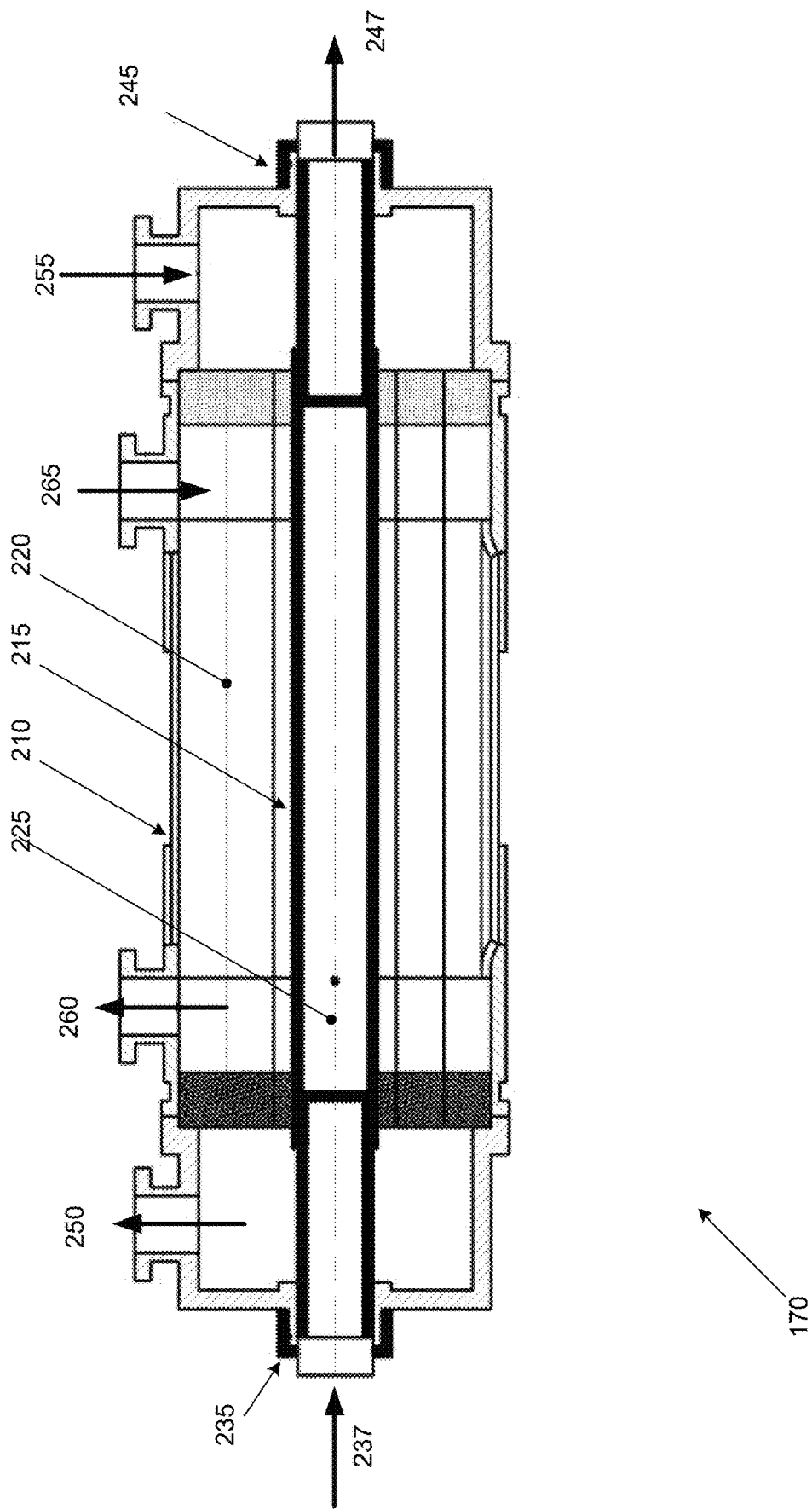
FIG. 5 is a cross sectional view of a regeneration cell according to the embodiment of FIG. 4.

FIG. 5 shows an application of the embodiment shown in FIG. 4 with a cell 170 having a housing 210 with a central core 215 defining an internal chamber 225 and a solvent chamber having hollow fibre membranes 220. Steam enters 237 at inlet 235 the housing and travels along the internal core 215 exiting 247 from outlet 245 at the far end of the housing 210 to heat the solvent. The solvent enters 265 into the solvent chamber 220 and exits 260 at the opposed end of the housing 210. The solvent chamber 220 includes a gas permeable membrane whereby the carbon dioxide permeates into the tube side of the permeable membrane which then exits 255.

The invention claimed is:

1. A system for regeneration of acidic gas solvent, the system comprising;
    a flash drum arranged to receive a solvent laden with an acidic gas and generate a lean amine flow;
    a lean rich heat exchanger, said lean amine flow arranged to pass through the lean rich exchanger;

a regeneration cell having a solvent chamber arranged to receive the lean amine flow from the lean rich heat exchanger, and an internal chamber arranged to receive a steam flow;

the regeneration cell including a gas permeable membrane separating the solvent chamber and internal chamber;

wherein the regeneration cell is arranged to vent acidic gas stripped from the lean amine flow by the steam.

2. The system according to claim 1, further including a re-boiler in communication with an outlet from the solvent chamber, the re-boiler arranged to heat the stripped amine so as to remove water, and direct the consequential steam flow to the internal chamber.

3. The system according to claim 1, further including a bulk removal regeneration cell, the bulk removal regeneration cell having a bulk removal solvent chamber arranged to receive a solvent flow, and a bulk removal internal chamber;

the bulk removal regeneration cell including a gas permeable membrane separating the bulk removal solvent chamber and bulk removal internal chamber;

wherein the bulk removal regeneration cell is arranged to vent acidic gas diffused from the solvent, and direct the solvent to the solvent chamber of the regeneration cell.

4. The system according to claim 1, wherein the solvent chamber is concentrically arranged around the internal chamber.

5. A method for regenerating acidic gas solvent, the method comprising the steps of:

receiving a solvent laden with an acidic gas in a flash drum and generating a lean amine flow;

passing the lean amine flow through a lean rich heat exchanger;

receiving the lean amine flow from the lean rich heat exchanger in a solvent chamber;

receiving a steam flow in an internal chamber;

separating the internal chamber from the solvent chamber with a gas permeable membrane;

stripping the acidic gas from the lean amine flow;

diffusing the acidic gas into the internal chamber; and venting the acidic gas from the internal chamber.

6. The method according to claim 5, further including the steps of:

re-boiling the stripped amine so as to remove water; and directing the consequential steam flow to the internal chamber.

7. The method according to claim 5, further including the steps, prior to the solvent receiving step of:

receiving the solvent flow in a bulk removal solvent chamber;

separating the bulk removal solvent chamber from a bulk removal internal chamber with a gas permeable membrane;

removing the acidic gas from the solvent;

diffusing the acidic gas through the gas permeable membrane;

venting the acidic gas from the bulk removal internal chamber; and directing the solvent to the solvent chamber of a regeneration cell.

* * * * *